United States Patent [19]

Ohmura et al.

[11] Patent Number: 4,659,769

[45] Date of Patent: Apr. 21, 1987

[54] PROCESS FOR PREPARING A NON-AQUEOUS LIQUID DISPERSION OF POLYMER MADE WITH A POLYMERIC PEROXIDE

[75] Inventors: Hiroshi Ohmura, Aichi; Masaharu Nakayama, Nagoya, both of Japan

[73] Assignee: Nippon Oil and Fats Co., Ltd., Tokyo, Japan

[21] Appl. No.: 465,074

[22] Filed: Feb. 9, 1983

Related U.S. Application Data

[63] Continuation of Ser. No. 221,162, Dec. 29, 1980, abandoned.

[30] Foreign Application Priority Data

Dec. 28, 1979 [JP] Japan .............................. 54-170248
Dec. 28, 1979 [JP] Japan .............................. 54-170249

[51] Int. Cl.$^4$ ...................... C08F 293/00; C08F 4/38; C08F 4/36; C08F 299/00
[52] U.S. Cl. ................................. 524/529; 524/533; 526/228; 526/232; 526/232.3
[58] Field of Search .................. 526/232.2, 228, 232, 526/232.3; 524/529

[56] References Cited

U.S. PATENT DOCUMENTS 3,037,948  6/1962  Landler ............................. 524/529
4,238,381  12/1980 Komai et al. ...................... 525/419
4,469,862  9/1984  Komai et al. ..................... 526/232.3

Primary Examiner—Joseph L. Schofer
Assistant Examiner—Peter F. Kulkosky
Attorney, Agent, or Firm—Flynn, Thiel, Boutell & Tanis

[57] ABSTRACT

A specialized polymeric peroxide is copolymerized with vinyl type monomers in the presence of organic liquid, thereby obtaining a solution of a copolymer having peroxy bonds therein.

This solution is admixed with vinyl type monomers which are different in composition from the ones used in the first copolymerization, and the resultant mixture is subjected to block copolymerization.

The obtained block copolymer solution is admixed with an organic liquid which exert solubility to one of polymers of the vinyl type monomers which are employed in the first or second copolymerization, whereby a non aqueous system liquid dispersion is obtained.

This dispersion contains a block copolymer in a high concentration and it also is splendid in uniformity of dispersion and dispersion stability.

5 Claims, No Drawings

PROCESS FOR PREPARING A NON-AQUEOUS LIQUID DISPERSION OF POLYMER MADE WITH A POLYMERIC PEROXIDE

This application is a continuation of Ser. No. 221,162, filed Dec. 29, 1980 and now abandoned.

BACKGROUND OF THE INVENTION

FIELD OF THE INVENTION

This invention relates to a process for producing a non-aqueous liquid dispersion of polymer made with a polymeric peroxide comprising a block copolymer or block copolymers dispersed homogeneously with splendid stability in an organic liquid.

In general, a non-aqueous system dispersion of polymers is useful in the fields of paints, inks, adhesives and the like as a coating composition having characteristic features of low viscosity and a high content of solid ingredients.

Use of such a non-aqueous system dispersion of polymers, especially in the field of paints, makes it possible to reduce the amount of solvent to be used and to replace conventional solvents with photochemically inactive solvents. For this reason, great future developments are expected for the dispersions as a paint having reduced pollution effects.

Most of the non-aqueous system dispersions of polymers which have been available, are dispersions prepared by polymerizing in an organic liquid a vinyl type monomer which is converted to a polymer insoluble in the organic solvent, employing a polymer soluble in the organic solvent as a dispersion stabilizer. The thus-prepared dispersion comprises the product polymer and the dispersion stabilizer, both of which are homogenously dispersed in the organic liquid.

As to the features of the polymers, it can be said that in the polymerization, active polymerization sites are formed on a part of the stabilizer molecules and react with a small part of the vinyl type monomer to be converted to the polymer insoluble in the organic liquid (hereinafter the latter polymer is referred to as insoluble polymer) to produce a block or graft copolymer consisting of a soluble polymer part originating from the dispersion stabilizer and an insoluble polymer part originating from the vinyl type monomer, and also that, at the same time, most parts of the vinyl type monomer which are subjected to polymerization do not take part in the block or graft copolymerization and are homopolymerized to produce the insoluble polymer.

As to the conventional non-aqueous system dispersion of polymers, there are problems that the solution has a low dispersion stability, since the solution contains a small amount of the above mentioned block or graft copolymer which is excellent in dispersion stability and contains a large amount of the above stated homopolymerized insoluble polymer, which is merely dispersed in the organic liquid by secondary physical bondings between the homopolymerized insoluble polymer and the block or graft copolymer. There are great problems, especially in the case in which the thus obtained non-aqueous system dispersion of polymers is used as a component for forming coating films.

As a result, the classes of vinyl type monomers which are usable for forming the insoluble polymer are restricted, since the block or graft copolymer and the insoluble polymer should be tightly bonded to each other through secondary physical bonds between molecules for maintaining the dispersion stability and, therefore, a vinyl type monomer which can produce a highly polar and rigid polymer exerting a large secondary binding force should necessarily be used in an large amount.

Accordingly, coating films obtained from such a non-aqueous system dispersion of polymers are poor in flexibility, resistance to moisture, resistance to acid and tight adhesion to articles to be coated. In addition, particles of the insoluble polymer cannot sufficiently be fused nor fluidized on the formation of the coating films, since the particles are hard. This results in films formed in a state of containing particles, which causes a decrease in the strength of the coating films.

Furthermore, the above mentioned non-aqueous dispersion of polymers is not sufficient in physical dispersion stability. For example, application of a high shearing stress to the solution for dispersing a pigment would result in aggregation whereby to precipitate the insoluble polymer, and there is a possibility of gelation or coagulation precipitation of the insoluble polymer when a polar solvent or plasticizer which exerts a large solubility to the insoluble polymer is added into the dispersion, because the dispersion stability on storage is greatly reduced.

Essential points of the above mentioned problems lie in that the block or graft copolymer having good dispersion stability and being the minor ingredient of the dispersion is bonded with the insoluble polymer, which is the major ingredient, through secondary bonds held by physical forces working between their molecules so as to give dispersion stability to the insoluble polymer.

In order to solve these problems, there are proposed processes using reaction systems in which much larger amounts of the block or graft copolymer are produced in the reaction of the dispersion stabilizers with the vinyl type monomers.

For example, processes are disclosed which give the non-aqueous system dispersions of polymers containing large amounts of block or graft copolymers produced by the reaction of dispersion stabilizers and vinyl type monomers in such a manner that a polymerizable vinyl group is introduced into the dispersion stabilizer molecules (U.S. Pat. No. 3,607,821, Japanese Patent Publication No. 23,350/1965 and Japanese Patent Laid-Open Publication Nos. 11,397/1972 and 126,093/1975); that an additional functional group other than a vinyl group and a further functional group which has a complementary nature to the additional functional group are introduced to the vinyl type monomer molecules and the dispersion stabilizer molecules, respectively (U.S. Pat. No. 3,365,414); and that a vinyl type monomer having a solubilizing polymer part in the side chain is used as the dispersion stabilizer (British Patent Nos. 1,096,912 and 1,206,442 and Japanese Patent Laid-Open Publication No. 30,434/1974).

These processes have advantages in that insoluble polymer parts are stably dispersed as low polar polymer parts because they provide the dispersions containing large amounts of the block or graft copolymer. However, on the other hand, there are some problems in the processes in actual production, such that it is very difficult to control the polymerization reactions with the result of gelation of the products or of difficulty in promoting the reactions.

Furthemore, there is proposed in Japanese Patent Laid-Open Publication No. 5,194/1974, a process using peroxyester type organic peroxides having two peroxy bonds in the molecules whose decomposition temperatures are different from each other, in that a vinyl type monomer is polymerized in a first step in an organic liquid at the lower decomposition temperature, which monomer is convertible to a product polymer soluble in the organic liquid and then a second vinyl type monomer convertible to a product polymer insoluble in the organic liquid is graft polymerized in the second step onto the first product polymer at the higher decomposition temperature in order to produce a non-aqueous system dispersion of polymers. In this process, half of the polymers produced in the first step polymerization are homopolymers which do not contribute to the graft polymerization in the second step polymerization according to the reaction mechanism because the used organic peroxide is bifunctional and about half of the polymers produced in the second step are also homopolymers. This results in a very low efficiency in grafting and, therefore, this process is not estimated as being a preferable one.

In the conventionally and actually used non-aqueous system dispersions of polymers, freedom in selecting the vinyl type monomers forming the insoluble polymer is very restricted as explained above and the process involves problems as to the dispersion stability.

Therefore, a satisfactory polymer has not yet been obtained as a polymer for forming coating films, but technical progress is eagerly expected.

SUMMARY OF THE INVENTION

An object of this invention is to provide a non-aqueous system dispersion of polymers, made using a polymeric peroxide, which dispersion is excellent in dispersion stability and contains a block copolymer in a high concentration.

Another object of this invention is to provide a non-aqueous system dispersion of polymers having a small average molecular weight which, when a coating composition is prepared from the non-aqueous system dispersion of polymers, shows a good thermal fusion fluidability and can form continuous coating layers which are excellent in smoothness and abundant in brightness of the resulting cured coating films.

A further object of this invention is to provide a non-aqueous system dispersion of polymes from peroxides which can be produced by simple steps.

The non-aqueous system dispersion of polymers of this invention is prepared by a method comprising: (a) copolymerizing one or more polymeric peroxides selected from the group consisting of the compounds having the general formulas (1) and (11), with one or more vinyl type monomers, in an organic liquid as defined in the below-stated definition (A), (hereinafter referred to as organic liquid (A)), thereby obtaining a solution of a copolymer having peroxy bonds therein dissolved in the above-stated organic liquid (A), (b) adding one or more vinyl-type monomers which are different in composition from the vinyl-type monomers used in the first copolymerization, or a mixture of the same and organic liquid (A), into the said solution of the copolymer having peroxy bonds therein and subjecting the resultant mixture to block copolymerization, (designated as second copolymerization hereinafter) and further (c) admixing an organic liquid as defined in the below-stated definitions (B) or (C) (hereinafter referred to as the organic liquids B and C, respectively) into the block copolymer solution, or into the block copolymer which was prepared by removing the organic liquid (A) from the block copolymer solution obtained in the step (b) according to a conventional method.

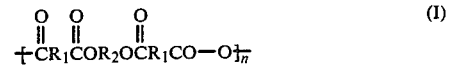

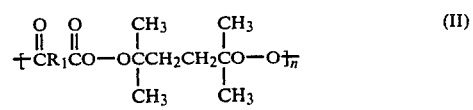

wherein $R_1$ represents a $C_1$-$C_{18}$ alkylene or substituted alkylene group, a $C_3$-$C_{15}$ cycloalkylene or substituted cycloalkylene group, or a phenylene or substituted phenylene group, $R_2$ represents (1) a $C_2$-$C_{10}$ alkylene group or substituted alkylene group, (2) a group having the formula of

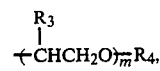

wherein $R_3$ is hydrogen atom or methyl group and m is an integer of 1 to 13,

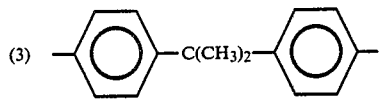

or

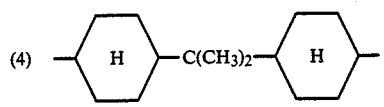

and n=2 to 20 definition (A); Organic liquids which exert solubility to the polymers of the vinyl type monomers which are copolymerized with the polymeric peroxides in the first copolymerization reaction and also exert solubility to the polymers of the vinyl type monomers which are polymerized with the copolymers having the peroxy bonds therein in the second copolymerization reaction.

definition (B); Organic liquids which do not exert solubility to the polymers of the vinyl type monomers which are copolymerized with the polymeric peroxides in the first copolymerization reaction but exert solubility to the polymers of the vinyl type monomers which are block copolymerized with the copolymers having the peroxy bond therein in the second copolymerization reaction.

definition (C); Organic liquids which exert solubility to the polymers of the vinyl monomers which are copolymerized with the polymeric peroxides in the first copolymerization reaction but do not exert solubility to the polymers of monomers which are block copolymerized with the copolymers having the peroxy bond therein in the second copolymerization reaction.

As the polymeric peroxides having the general formula (1) employed in the present invention, there are mentioned the following:

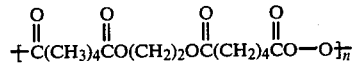

-continued $$+[C(CH_3)_4COCH(CH_3)CH_2OC(CH_2)_4CO-O]_{\overline{n}}$$

$$+[C(CH_3)_4CO(CH_2)_4OC(CH_2)_4CO-O]_{\overline{n}}$$

$$+[C(CH_3)_4CO(CH_2)_4OC(CH_2)_4CO-O]_{\overline{n}}$$

$$+[C(CH_3)_4CO(CH_2)_2O(CH_2)_2OC(CH_2)_4CO-O]_{\overline{n}}$$

$$+[C(CH_2)_4CO(CH_2)_2O(CH_2)_2O(CH_2)_2OC(CH_2)_4CO-O]_{\overline{n}}$$

$$+[C(CH_2)_4CO+CH_2CH_2O\!\!+_{\overline{14}}C(CH_2)_4CO-O]_{\overline{n}}$$

$$+[C(CH_2)_{10}CO(CH_2)_2OC(CH_2)_{10}CO-O]_{\overline{n}}$$

$$+[C(CH_2)_{10}CO(CH_2)_2O(CH_2)_2OC(CH_2)_{10}CO-O]_{\overline{n}}$$

$$+[C(CH_3)_{10}CO(CH_2)_2O(CH_2)_2O(CH_2)_2OC(CH_2)_{10}CO-O]_{\overline{n}}$$

$$+[C-\text{(Ar)}-CO-\text{(Ar)}-C(CH_3)_2-\text{(Ar)}-OC-\text{(Ar)}-CO-O]_{\overline{n}}$$

$$+[C-\text{(Ar)}-CO-\text{(H)}-C(CH_3)_2-\text{(H)}-OC-\text{(Ar)}-CO-O]_{\overline{n}}$$

$$+[C(CH_2)_4CH(CH_2)_4CO(CH_2)_2OC(CH_3)_6CH(CH_2)_5CO-O]_{\overline{n}}$$
$$\qquad\quad | \qquad\qquad\qquad\qquad\qquad\qquad |$$
$$\qquad\quad CH_3CH_2 \qquad\qquad\qquad\qquad\quad CH_3CH_2$$

$$+[C-\text{(H)}-CO(CH_3)_2OC-\text{(H)}-CO-O]_{\overline{n}}$$

$$+[C-\text{(Ar-COOCH}_3\text{)}-CO(CH_2)_2OC-\text{(Ar-COOCH}_3\text{)}-CO-O]_{\overline{n}}$$

$$+[C(CH_2)_4COCH_2CCH_2OC(CH_2)_4CO-O]_{\overline{n}}$$
$$\qquad\qquad\qquad\quad |$$
$$\qquad\qquad\qquad CH_3$$

(n = 2~20)

As the polymeric peroxides having the general formula (11) employed in the present invention, there are mentioned as the following;

$$+[C(CH_2)_4CO-OCCH_2CH_2CO-O]_{\overline{n}}$$
$$\qquad\qquad\quad | \qquad\quad |$$
$$\qquad\qquad\quad CH_3 \quad CH_3$$

$$+[C(CH_2)_{10}CO-OCCH_2CH_2CO-O]_{\overline{n}}$$
$$\qquad\qquad\quad\quad | \qquad\qquad |$$
$$\qquad\qquad\quad\quad CH_3 \qquad\quad CH_3$$

$$+[C(CH_3)_5CH(CH_2)_6CO-OCCH_2CH_2CO-O]_{\overline{n}}$$
$$\qquad\qquad |\qquad\qquad\qquad\qquad |\qquad\quad |$$
$$\qquad\quad CH_2CH_3 \qquad\qquad\quad CH_3 \quad CH_3$$

$$+[C-\text{(H)}-CO-OCCH_2CH_2CO-O]_{\overline{n}}$$
$$\qquad\qquad\qquad\quad |\qquad\qquad |$$
$$\qquad\qquad\qquad CH_3 \qquad\quad CH_3$$

$$+[C-\text{(Ar)}-CO-OCCH_2CH_2CO-O]_{\overline{n}}$$
$$\qquad\qquad\qquad\qquad |\qquad\qquad |$$
$$\qquad\qquad\qquad\quad CH_3 \qquad\quad CH_3$$

$$+[C-\text{(Ar-COOCH}_3\text{)}-CO-OCCH_2CH_2CO-O]_{\overline{n}}$$
$$\qquad\qquad\qquad\qquad\quad\quad |\qquad\qquad |$$
$$\qquad\qquad\qquad\qquad\quad\quad CH_3 \qquad\quad CH_3$$

(n = 2~20)

The polymerization mechanisms of the vinyl type monomers which depend on these polymeric peroxides can be explained as follows: First, polymerization of one or more than one vinyl type monomer in the above stated step (a) forms copolymers in which peroxy bondings have been introduced; second, polymerization of thus-produced copolymer having the peroxy bonds therein with the addition of one or more than one monomer which are different from the first stated one or more than one monomers in the composition, in the specified organic liquid results in the cleaving of the peroxy bonds of the copolymer having the peroxy bonds therein which initiates block copolymerization and forms the block copolymer with a good efficiency. The block copolymers consist of insoluble polymer parts derived from the above-stated copolymers having the peroxy bonds therein and of soluble polymer parts derived from the second vinyl type monomer, or the block copolymers consist of soluble polymer parts derived from the above-stated copolymers having the peroxy bonds therein and of insoluble polymer parts derived from the second vinyl type monomer.

Steps (c) and (b) effect the aggregation of the insoluble polymer parts to give particle-like shapes and the extension of the soluble polymer parts into the organic liquid, which result is a dispersed state of the block copolymers of particle-like shapes.

The above stated organic liquids A and B should be selected to use from the above stated groups A and B, so as to exert the solubility or insolubility depending on the respective classes of the vinyl type monomers used in the above stated step (a) and those used in the above stated step (b).

Examples of the species which are selected depending on the classes of the vinyl type monomers are listed in Table 1.

More detailed examples of the organic liquid stated in Table 1 are as follows:

polymer of the vinyl type monomers in the organic liquids as shown in Table 1.

TABLE 1

| Vinyl type Monomers | Organic liquid exerting solubility on the polymer of the vinyl type monomer which described in the left column | Organic liquid not exerting solubility on the polymer of the vinyl type monomer which described in the left column |
| --- | --- | --- |
| Lower alkyl acrylates or methacrylates, vinyl esters of lower fatty acids and allyl glycidyl ether | Esters, Ketones, Aromatic hydrocarbons and Ether alcohols and $C_1$-$C_4$ Alcohols (only polymers of ethyl acrylate or metha crylate being soluble in the last mentioned alcohols) | Aliphatic or cyclo-aliphatic hydrocarbons and Alcohols (polymers of ethyl acrylate or methcrylate being insoluble in the alcohols higher than those of $C_5$ |
| Higher alkyl acrylates or methacrylates and vinyl esters of higher fatty acids | Esters, Ketones, Aromatic hydrocarbons, Aliphatic or cyclo-aliphatic hydrocarbons, Higher alcohols, Dimethyl formamide and Ether alcohols | Lower alcohols |
| Aromatic vinyl type monomers | Esters, Ketones, Aromatic hydrocarbons, Dimethyl formamide and Ether alcohols | Alcohols and Aliphatic or cyclo-alipatic hydrocarbons |
| Vinyl type monomers containing hydroxyl groups and vinyl type monomers containing carboxyl groups | Alcohols, Dimethyl formamide and Ether alcohols | Aliphatic or cyclo-aliphatic hydrocarbons, Aromatic hydrocarbons, Esters and Ketones |
| Vinyl chloride, Vinylidene chloride and Acrylonitrile or Methacrylonitrile | Ketones. Dimethyl formamide and Tetrahydrofuran | Aliphatic or cycloaliphatic hydrocarbons, Aromatic hydrocarbons and Alcohol |
| Acryl amide | Dimethyl formamide and Dimethyl sulfoxide | Aliphatic or cycloaliphatic hydrocarbons, Esters, Ketones and Alcohols |
| Butadiene | Esters, Ketones, Aromatic hydrocarbons and Cyclo-aliphatic hydrocarbons | Alcohols |

Aliphatic or alicyclic hydrocarbons are, for example, n-hexane, n-heptane, n-octane, petroleum benzine, ligroin, mineral spirits, petroleum naphtha, kerosene, cyclohexane methyl cyclohexane and the like;

Aromatic hydrocarbons are, for example, toluene, xylene and the like;

Esters are, for example, ethyl acetate, butyl acetate and the like;

Ketones are, for example, methyl ethylketone, methyl isobutyl ketone, cyclohexanone and the like;

Lower alcohols are, for example, methanol, ethanol, n-propanol isopropanol and the like;

Higher alcohols are, for example, butanol, pentanol, hexanol, octanol and the like; and ether alcohols are, for example, ethylene glycol monomethyl ether, ethylene glycol monoethyl ether, ethylene glycol monobutyl ether and the like.

These organic liquids are selected so as to meet the requirements defined in the above mentioned articles (A) and (B).

They are used in liquid form containing one or more than one of the organic liquids as the main component.

However, another organic liquid or liquids can be contained in the above-defined organic liquids to the extent that the addition of the other organic liquid or liquids do not disturb substantially the insolubility of the insoluble polymer parts of the block copolymer and also the solubility of the soluble parts of the block copolymer.

The vinyl type monomers used in this invention involve those used in the above mentioned step (a) or (b) and as to the classes of the above stated organic liquids, the specified vinyl type monomers used in the respective step (a) or (b) are selected from the view points to meet the relations of the solubility or insolubility of the The monomers which can be selected are, for example, lower alkyl acrylates or methacrylates (hereinafter the acrylate or methacrylate being referred to as (meth)acrylate), such as methyl(meth)acrylate, ethyl(meth)acrylate, n-propyl(meth)acrylate, isopropyl(meth)acrylate, glycidyl(meth)acrylate and the like; higher alkyl(meth)acrylates such as n-butyl(meth)acrylate, isobutyl(meth)acrylate, tertbutyl(meth)acrylate, n-hexyl(meth)acrylate, cyclohexyl(meth)acrylate 2-ethylhexyl(meth)acrylate, octyl(meth)acrylate, lauryl(meth)acrylate, stearyl(meth)acrylate and the like; vinyl esters of lower carboxylic acids such as vinyl acetate, vinyl propionate and the like; vinyl esters of higher carboxylic acids such as vinyl butyrate, vinyl caproate, vinyl 2-ethyl hexanoate, vinyl laurate, vinyl stearate and the like; aromatic vinyl type monomers such as styrene, vinyl toluene, vinyl pyrrolidone and the like; vinyl type monomers containing amide groups such as acryl- or methacrylamide, N-methylol acryl- or N-methylol methacrylamide, N-methoxy-methyl acryl- or N-methoxymethyl methacrylamide and the like; vinyl type monomers containing hydroxyl groups such as hydroxyethyl(meth)acrylate, hydroxypropyl(meth)acrylate, allyl alcohol and the like; vinyl type monomers containing carboxyl groups such as acrylic or methacrylic acid, itaconic acid, crotonic acid, fumaric acid, maleic acid and the like; butadiene; vinyl chloride; vinylidene chloride; acrylonitrile methacrylonitrile, dibutyl fumarate; maleic anhydride; dodecyl succinic anhydride; and allyl glycidyl or methallyl glycidyl ether. As to these exemplified vinyl type monomers, one or more than one of them are used as the main components of the vinyl type monomers of the above-stated step (a) or (b) and vinyl type monomers other than the above stated main component vinyl type monomers can be added to the above-stated main component vinyl type monomers to the extent that the addition of the other monomers does not disturb substantially the solubility or insolubility of the soluble or insoluble parts of block copolymers derived from the main component vinyl type monomers.

Copolymers having peroxy bondings used in this invention can be easily prepared by polymerizing vinyl type monomers using polymeric peroxides shown in the above stated general formula (1) and/or those shown in the above stated general formula (11), in a conventional solution polymerization.

In these cases, the amounts of the polymeric peroxides to be used are preferably in the range of 0.5 to 10 parts by weight of above-stated vinyl type monomers. Polymerization temperature and polymerization time are preferably in the ranges of 60° to 130° C. and 2 to 5 hours, respectively. In the first step polymerization, a single polymeric peroxide or a mixture of more than one of the polymeric peroxides can be used.

In the block copolymerization reaction, the reaction temperature and the reaction time are preferably in the ranges of 60° to 140° C. and 3 to 6 hours, respectively.

The amounts of the organic liquids to be used are preferably in the range of 70 to 30% by weight, in which the non aqueous system dispersions of polymers contain solid matters in amounts ranging from 30 to 70% by weight.

The ratios of the soluble polymer parts and the soluble polymer parts of the block copolymers are not especially limited but the amounts of soluble polymer parts are preferably in a range of 5 to 70% by weight and especially 10 to 50% by weight based on the sum of the amounts of the soluble and insoluble polymer parts, in view of the stability of the dispersion of this invention as well as the characteristics of the resulting coatings.

It is possible to add various additives such as other polymers, pigments, fillers and the like to the non-aqueous system dispersion of polymers of this invention.

They can also be used as polymer compositions capable of forming thermosetting coating films by adding to them a curing agent or polymers having a functional group or groups which have complementary nature to the functional groups of the polymers contained in the non-aqueous system dispersions of polymers of this invention.

The curing agents are, for example, butylated melamine formaldehyde resins, butylated benzoguanamine formaldehyde resins, butylated urea formaldehyde resins, blocked isocyanate resins, polyepoxides os aromatic, aliphatic or alicyclic compounds, polyamide resins, vinyl resins containing a glycidyl, carboxyl, hydroxyl, isocyanate or alkoxymethylolated amide group and the like.

As explained above, the process for producing the non-aqueous system dispersion of polymers of this invention has the below mentioned advantages as compared with conventional processes and is of very high industrial value.

(1) The production steps are very simple and this shows industrial advantages.

(2) Almost all portions of the product polymer are of the block copolymer comprising the polymer part soluble in the organic liquids and that insoluble in the organic liquids.

Therefore, non-aqueous system dispersions of polymers excellent in dispersion stability which contain the block copolymer in high concentration can be obtained.

(3) The resulting block copolymers have relatively small average molecular weights, since both the copolymerization reaction of step (a) and block copolymerization reaction of step (b) are carried out in solution polymerizations in this invention.

This results in an effect that the product non-aqueous system dispersions of polymers have low values of viscosity. Further, when coating compositions prepared from the non-aqueous system dispersions of polymers of this invention are applied for forming coatings, the resulting coating films show good thermal fusion fluidability due to the above stated small average molecular weights, and further result in cured coatings showing excellent smoothness. Thus, continuous coating layers rich in brightness can be formed.

The production process of this invention is illustrated in much more detail in the following Examples, which do not restrict to the invention.

Parts and percentages described in the Examples are all based on parts and percentages by weight.

PREFERRED EMBODIMENTS OF THE INVENTION

EXAMPLE 1

(A-1): Preparation of a solution of a polymer having peroxy bonds therein

Into a reaction vessel which was equipped with a thermometer, a stirrer and a reflux condenser, there were charged 110 parts of stearyl methacrylate, 6.8 parts of

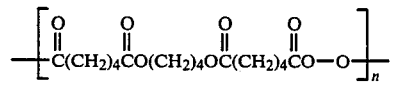

(n ≈ 5.5)

and 80 parts of ethyl acetate. The mixed solution was heated at 70° C. while introducing nitrogen gas therein and was subjected to a polymerization reaction for 3 hours.

The resulting product contained 59.5 wt. % of polymers having peroxy bonds therein and it was a transparent liquid whose viscosity at 25° C. was 4.5 poise. This obtained product is hereinafter designated as (A-1) product.

(B-1): Preparation of a block copolymer solution 190 parts of (A-1) product were charged into the same reaction vessel as used in the (A-1) procedure, the contents of the reaction vessel were heated at 75° C. and nitrogen gas was introduced therein. A mixed solution having the following composition in parts Ethyl methacrylate: 61.1
Hydroxypropyl methacrylate: 6.4
Methacrylic acid: 2.5 was charged into the reaction vessel over a period of 1.5 hours.

The contents of the reaction vessel were subjected to polymerization at 80° C. for 4 hours, thereby to obtain a transparent block copolymer dispersion.

(C-1): Preparation of a non-aqueous system solution of polymers

The entire quantity of the block copolymer solution obtained by the (B-1) procedure was admixed with 100 parts of ethyl alcohol, thereby to obtain a milky white liquid dispersion of polymers.

This dispersion contained 50.8 wt.% of block copolymers and its viscosity at 25° C. was 1.7 poise.

The dispersion was allowed to stand at 25° C. for six months. It was so stable that the particles therein did not precipitate and it did not separate into two phases and the viscosity thereof did not change.

The obtained liquid dispersion was applied onto a mild steel plate to obtain a dried coating film of 30–40μ in thickness, which was further heated at 140° C. for 30 minutes, whereby the obtained film was very lustrous and smooth and there were recognized neither flagging nor foaming therein.

EXAMPLE 2

(A-2): Preparation of a solution of a copolymer having peroxy bonds therein

Into the same reaction vessel as used in the (A-1) procedure, there were charged 100 parts of stearyl methacrylate, 6.8 parts of

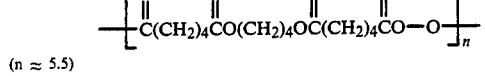

(n ≈ 5.5)

and 70 parts of ethyl acetate.

The contents of the reaction vessel were heated at 70° C. while introducing nitrogen gas therein and were subjected to polymerization for 3 hours, whereby a transparent liquid whose viscosity at 25° C. was 4.3 poise and containing 59.9 wt.% of polymer having peroxy bonds therein, was obtained.

(B-2): Preparation of a block copolymer solution

Into the same reaction vessel as used in the (A-2) procedure, there were charged 170 parts of the (A-2) product.

The contents of the reaction vessel were heated at 75° C. while introducing nitrogen gas therein, wherein a mixed solution having the following composition in parts Ethyl methacrylate: 69.8
Hydroxypropyl methacrylate: 7.3
Methacrylic acid: 2.9
Ethyl acetate: 20 was charged into the reaction vessel for 1.5 hours. The contents of the reaction vessel were subjected to polymerization at 80° C. for 4 hours, whereby a transparent liquid of block copolymer was obtained.

(C-2): Preparation of a non-aqueous system dispersion of polymers

The whole quantity of the block copolymer obtained by the (B-2) procedure was admixed with 100 parts of ethyl alcohol, whereby a milky white non-aqueous system liquid dispersion of polymers was obtained.

This liquid dispersion contained 49.2 wt.% of block copolymers and its viscosity at 25° C. was 1.6 poise. The dispersion was allowed to stand at 25° C. for six months. It was so stable that the particles therein did not precipitate, it did not separate into two layers and the viscosity thereof did not change.

It was applied to the coating test according to the same procedures as those in Example 1, whereby the obtained film was very lustrous and smooth and there were recognized neither foaming nor flagging therein.

EXAMPLE 3

(A-3): Preparation of a solution of copolymer having peroxy bonds therein

According to the same procedures as those in the (A-2) procedure of Example 2, a solution of copolymer having peroxy bonds therein was prepared, employing 100 parts of vinyl acetate, 6.8 parts of

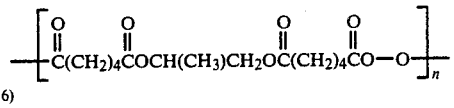

(n ≈ 5.6)

and 70 parts of methylisobutyl ketone.

This solution contained 59.6 wt.% of copolymers having peroxy bonds therein. It was a transparent liquid whose viscosity at 25° C. was 5.8 poises.

(B-3): Preparation of a block copolymer solution

According to the same procedures as those in the (B-2) procedures of Example 2, employing a mixed solution having the following composition in parts n-Butyl methacrylate: 80
Methylisobutyl ketone: 20 a block copolymer solution was prepared.

(C-3): Preparation of a non-aqueous system dispersion of polymers

The entire quantity of the block copolymer solution obtained by the (B-3) procedure was added and mixed with 100 parts of mineral spirit, whereby a milky white non-aqueous system liquid dispersion of polymers was obtained.

This dispersion contained 49.0 wt% of block copolymers and its viscosity was 2.0 poise at 25° C. It was so stable that after it was allowed to stand at 25° C. for 6 months, the particles therein did not precipitate and the viscosity thereof did not change.

This dispersion was applied to the coating test according to the same procedures as those in Example 1, whereby the obtained film was very lustrous and smooth, and there were recognized neither foaming nor flagging therein.

EXAMPLE 4-7

(A-4~A-7): Preparation of a solution of copolymer having peroxy bonds therein

According to the same procedures as those in the (A-1) procedure of Example 1, respective solutions of copolymer having peroxy bonds therein were prepared with the respective charging compositions as shown in the respective A columns of Example 4-7 in Table 2.

The obtained solutions were all transparent solutions. Their viscosities and content of copolymers having peroxy bonds therein are shown in the A columns of Table 2.

(B-4~B-7): Preparation of a block copolymer solution

TABLE 2

| Charging Compositions and properties of the obtained product | | Examples | | | | | | | | | |
|---|---|---|---|---|---|---|---|---|---|---|---|
| | | 5 | | | 6 | | | 7 | | | |
| | | (A) | (B) | (C) | (A) | (B) | (C) | (A) | (B) | (C) | |
| Charging Composition | | | | | | | | | | | |
| Vinyl type monomer | 2-Ethylhexyl methacrylate | 50.9 | | | | | | | | | |
| | n-Butyl acrylate | | | | 30 | | | | | | |
| | n-Butyl methacrylate | | | | | | | 704 | | | |

TABLE 2-continued

| Charging Compositions and properties of the obtained product | | Examples | | | | | | | | | | |
|---|---|---|---|---|---|---|---|---|---|---|---|---|
| | | \  | \  | \  | 5 | | | 6 | | | 7 | |
| | | (A) | (B) | (C) | (A) | (B) | (C) | (A) | (B) | (C) | (A) | (B) | (C) |
| | Methyl methacrylate | 82.5 | | | | 18.4 | | 10 | | | | | |
| | Ethyl methacrylate | | | | | | | | | | 100 | | |
| | Vinyl acetate | | | | | | | 20 | | | | | |
| | Hydroxyethyl methacrylate | | 15.9 | | | 30.6 | | | 10 | | | 9.6 | |
| | Acrylic acid | | 3.2 | | | 1.0 | | | | | | | |
| | Styrene | 27.5 | | | | | | | | | | | |
| | Acrylonitrile | | | | | | | | | | | | |
| | Acrylamide | | | | 100 | | | | | | | | |
| | Vinyl chloride | | | | | | | 80 | | | | | |
| | Solution of copolymers having peroxy bonds therein obtained by A-procedure | | 190 | | | 170 | | | 170 | | | 170 | |
| Organic liquid | Butyl acetate | 80 | | | | | | | | | | | |
| | Dimethyl formamide | | | | 70 | | | | | | | | |
| | Methylisobutyl ketone | | | | | | | 70 | | | | | |
| | Mineral spirit | | | | | | | | | 90 | | | |
| | Petroleum naphtha | | | | | | | | | | | | 100 |
| | Toluene | | | | | | | | | | | 60 | |
| | n-Butyl alcohol | | | 100 | | | | | | | | | |
| | Isopropyl alcohol | | | | | | 90 | | | | | | |
| | Ethyl cellosolve | | | | | | | | | | | 10 | |
| | Polymeric Peroxide | | | | | | | | | | | | |
| | PPO-1[1] | | | | | | | | | | | 6.8 | |
| | PPO-2[2] | 7.0 | | | 7.0 | | | 6.0 | | | | | |
| Properties of the obtained product | Content of copolymer having peroxy bonds therein (%) | 58.9 | | | 41.2 | | | 57.7 | | | 59.9 | | |
| | Content of block copolymer (%) | | | 51.0 | | | 49.5 | | | 49.4 | | | 49.0 |
| | Viscosity (25° C. poise) | 7.0 | 1.7 | 7.5 | | 1.6 | 10.3 | | 2.8 | 5.3 | | | 0.6 |

Note:

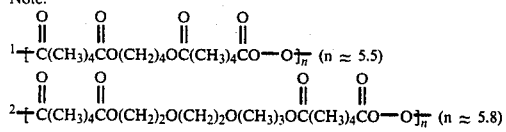

[1] $+C(CH_3)_4CO \cdot O(CH_2)_4OC(CH_3)_4CO-O+_n$ (n ≈ 5.5)

[2] $+C(CH_3)_4CO \cdot O(CH_2)_2O(CH_2)_2O(CH_3)_3OC(CH_3)_4CO-O+_n$ (n ≈ 5.8)

According to the same procedures as those in the (B-1) procedure of Example 1, respective block copolymers were prepared with the respective charging ratios as shown in the B column of Table 2.

(C-4~C-7): Preparation of non-aqueous system dispersion of polymers

The entire quantity of the respective block copolymer solutions obtained by the (B-4~B-7) procedures were added and mixed with organic liquids as shown in the C column of Table 2, whereby milky white non-aqueous system dispersions of polymers were obtained.

The content of block copolymers in the respective dispersions and their viscosities are shown in the C columns of Table 2.

All the dispersions were allowed to stand at 25° C. for six months. All were so stable that the particles therein did not precipitate and the viscosity thereof did not change.

The respective dispersions were subjected to the coating test, according to the same procedures as those in Example 1, whereby all of the obtained coating films were lustrous and smooth and there were recognized neither foaming nor flagging therein.

EXAMPLE 8-9

(A-8-A-9): Preparation of solutions of copolymers having peroxy bonds therein

According to the same procedures as those in (A-1) the Example 1, except that the charging composition as shown in the A columns of Examples 8 and 9 in Table 3, was employed, and that the polymerization temperature for Example 8 was 90° C. and for Example 9 was 100° C., solutions of copolymers having peroxy bonds therein was respectively prepared.

The respectively obtained solutions contained the content of copolymers having peroxy bonds therein as shown in the A columns of Table 3 and were transparent solutions whose viscosities are shown in the A columns of Table 3.

(B-8-B-9); Preparation of block copolymer solutions

According to the same procedures as those in (B-1) procedure of Example 1, except that the respectively obtained copolymers having peroxy bonds therein, prepared by the (A-8A-9) procedures, were employed, the charging compositions which are shown in the B columns of Table 3 were employed and that the block copolymerization temperature for Example 8 was 95° C. and that for Example 9 was 105° C., block copolymer solutions were respectively prepared.

(C-8-C-9); Preparation of non-aqueous system dispersions of polymers.

The entire quantity of respective block copolymer solutions, which were obtained by the (B-8-B-9) procedures, were applied to a freeze-drying method, thereby freezing the organic liquids which were charged in the (A-8-A-9) procedures, followed by removing the organic liquids from the block copolymer under reduced pressure to obtain the dried block copolymers.

The obtained block copolymers were respectively mixed with the organic liquids which are shown in the C columns of Table 3 (defined in the previously stated definition B) whereby the desired milky white non-aqueous system liquid dispersions were obtained.

TABLE 3

| Charging composition and properties of the obtained product | | Examples | | | | | |
|---|---|---|---|---|---|---|---|
| | | 8 | | | 9 | | |
| | | (A) | (B) | (C) | (A) | (B) | (C) |
| Charging Composition | | | | | | | |
| Vinyl type monomer | Lauryl methacrylate | 32 | | | | | |
| | 2-Ethylhexyl methacrylate | | | | 27.0 | | |
| | n-Butyl methacrylate | | 14 | | | | |
| | Methyl methacrylate | 25.0 | | | 78.6 | | |
| | Ethyl methacrylate | 50.0 | | | | | |
| | Hydroxyethyl methacrylate | | | | 6.4 | | |
| | Acrylic acid | 12.5 | 4 | | 1.6 | | |
| | Styrene | | | | 31.4 | | |
| | Acrylonitrile | 37.5 | | | | | |
| | Solution of polymers having peroxy bonds therein obtained by A-procedure | | 250 | | | 260 | |
| Organic liquid | Ethyl acetate | | | | 75 | | |
| | Methylethyl ketone | 62.5 | | | | | |
| | Aliphatic hydrocarbon[1] | | | 165 | | | |
| | n-Butyl alcohol | 62.5 | | | | | 150 |
| | Ethyl cellosolve | | | | 75 | | |
| | Polymeric Peroxide | | | | | | |
| | PPO-3[2] | 2.5 | | | 11 | | |
| | PPO-4[3] | 6.25 | | | | | |
| Properties of the obtained product | Content of copolymer having peroxy bonds therein (%) | 41.5 | | | 44.1 | | |
| | Content of block copolymer (%) | | | 51.5 | | | 51.0 |
| | Viscosity (25° C. poise) | 2.2 | 1.1 | 0.5 | | 2.0 | |

Note
[1] Product of Shell Chemical Co.,; Trade Mark; Shellsol 71, Aliphatic hydrocarbons whose distillation temperature range is 173–195° C. according to ASTM D-1078

[2] 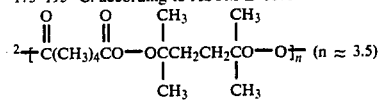 $-\!\!\left[\!C(CH_3)_4CO\!-\!\!\begin{array}{c}O\\\|\end{array}\!\!OCCH_2CH_2CO\!-\!O\!\right]_{\!n}^{\!-}$ (n ≈ 3.5)

[3] 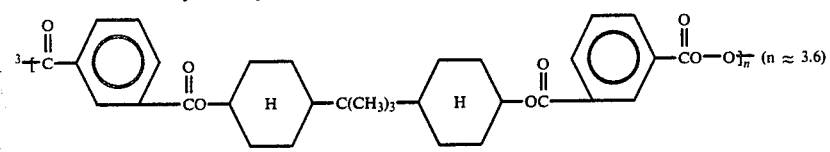 (n ≈ 3.6)

The content of the block copolymer of these dispersions and the viscosity thereof are shown in the C columns of Table 3.

After these dispersions were respectively allowed to stand at 25° C. for 6 months, they were so stable that the particles therein did not precipitate, they did not separate into two phases and the viscosity thereof did not change.

These dispersions were respectively applied to the coating test according to the same procedures as those in Example 1.

The obtained films were lustrous and smooth and there were recognized neither foaming nor flagging therein.

EXAMPLE 10

(A-10): Preparation of a solution of copolymers having peroxy bonds therein

Into the same reaction vessel as used in Example 1, there were charged 40 parts of stearyl methacrylate, 2.5 parts of

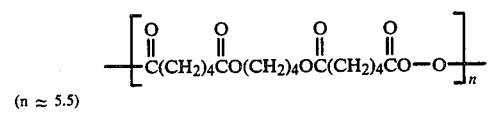

(n ≈ 5.5)

and 50 parts of ethyl acetate.

The contents of the reaction vessel were heated up to 70° C., while introducing nitrogen gas therein, and were subjected to copolymerization for 3 hours whereby a transparent solution whose viscosity at 25° C. was 0.5 poise was obtained. It contained 43.4 wt.% of copolymers having peroxy bonds therein.

(B-10): Preparation of a solution of block copolymers

Into the same reaction vessel as used in the (A-10) procedure of Example 10, there were charged 90 parts of the (A-10) product.

The contents of the reaction vessel were heated at 75° C., while introducing nitrogen gas therein, wherein a mixture having the following composition in parts, Methyl methacrylate: 67
Ethyl methacrylate: 29
Hydroxypropyl methacrylate: 10
Methacrylic acid: 4 was added dropwise for 1.5 hours. The resultant mixture was further subjected to polymerization at 80° C. for 4 hours, whereby a transparent liquid was obtained.

(C-10): Preparation of a non-aqueous system dispersion of polymers

The entire quantity of the (B-10) product was added and mixed with 100 parts of mineral spirit, thereby obtaining a milky white non-aqueous system dispersion of polymers.

This dispersion contained 49.7 wt.% of block copolymers and its viscosity was 2.3 poise at 25° C. It was so stable that after it was allowed to stand at 25° C. for 6 months, the particles therein did not precipitate, it did not separate into two layers, and its viscosity did not change at all.

This dispersion was coated onto a mild steel plate to obtain a dried coating film of 30–40μ in thickness, following which it was heated forcibly at 140° C. for 30 minutes, whereby the obtained film was lustrous and smooth and neither flagging nor foaming therein was observed.

EXAMPLE 11

(A-11): Preparation of a solution of copolymers having peroxy bonds therein

Into the same reaction vessel as used in Example 1, there were charged 35 parts of stearyl methacrylate, 2.5 parts of

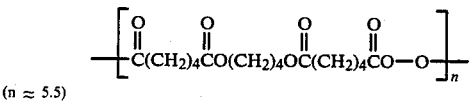

(n ≈ 5.5)

and 30 parts of ethyl acetate.

The contents of the reaction vessel were heated at 70° C., while introducing nitrogen gas therein and were subjected to copolymerization for 3 hours whereby a transparent solution which contained 52.7 wt% of the copolymer having peroxy bonds therein and whose viscosity was 2.5 poise at 25°0 C. was obtained.

(B-11): Preparation of a solution of block copolymers

Into the same reaction vessel as used in the (A-11) procedure, there were charged 60 parts of the (A-11) product. The contents of the reaction vessel were heated at 75° C. while introducing nitrogen gas therein, wherein a mixture having the following composition in parts;

Methyl methacrylate: 67
Ethyl methacrylate: 29
Hydroxypropyl methacrylate: 10
Methacrylic acid: 4
Ethyl acetate: 20 was added dropwise for 1.5 hours. The resultant mixture was subjected to copolymerization at 80° C. for 4 hours, whereby a transparent solution of block copolymers was obtained.

(C-11): Preparation of a non-aqueous sysyem dispersion of polymers

The entire quantity of the (B-11) product was added and mixed with 100 parts of mineral spirit, whereby a milky white non-aqueous system dispersion of polymers was obtained.

This dispersion contained 49.0 wt.% of block copolymers and its viscosity was 2.1 poise at 25° C. This dispersion was so stable that after it was allowed to stand at 25° C. for 6 months, no appreciable precipitation of the particles therein, no appreciable separation thereof into two layers and no change of the viscosity thereof were observed.

This dispersion was applied to the coating test according to the same procedure as in Example 10, whereby the obtained film was lustrous and smooth and neither foaming nor flagging therein were observed.

EXAMPLE 12

(A-12): Preparation of a solution of copolymers having peroxy bonds therein

According to the same procedures as in the (A-11) procedure, a solution of copolymers having peroxy bonds therein was prepared, employing 35 parts of n-butyl methacrylate, 2.5 parts of

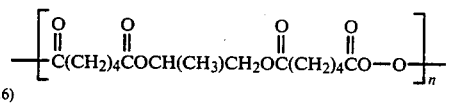

(n ≈ 5.6)

and 30 parts of methylisobutyl ketone.

This solution contained 53.5 wt.% of copolymers having peroxy bonds therein. It was a transparent solution whose viscosity was 1.5 poise at 25° C.

(B-12): Preparation of a block copolymer solution

According to the same procedures as those in the (B-11) procedure of Example 11, employing a mixture having the following composition in part (A-12) product: 60
Vinyl acetate: 110
Methylisobutyl ketone: 20 a solution of block copolymers was prepared.

(C-12): Preparation of a non-aqueous system dispersion of polymers 100 parts of mineral spirit was added to the entire quantity of the (B-12) product and the resultant mixture was blended, thereby obtaining a milky white non-aqueous system dispersion of polymers which contained 51.0 wt.% of block copolymers and whose viscosity at 25° C. was 1.9 poise.

This dispersion was so stable that after it was allowed to stand at 25° C. for 6 months, no appreciable precipitation of the particles therein, no appreciable separation thereof into two layers and no appreciable change of the viscosity thereof were observed.

This dispersion was applied to a coating test, according to the same procedures as those in Example 10, whereby the obtained film was lustrous and smooth and neither appreciable foaming nor flagging therein were observed.

EXAMPLE 13–17

(A-13~A-17); Preparation of a solution of copolymers having peroxy bonds therein According to the same procedures as those in the (A-10) procedure of Example 10, employing the respective charging compositions as shown in the A columns of Examples 13~17 in Table 4, respective solutions having peroxy bonds therein were prepared.

Each solution contained the content of copolymers having peroxy bonds therein as shown in the A columns of Table 4.

It was respectively a transparent solution whose viscosity was that shown in Table 4.

(B-13~B-17); Preparation of a block copolymer solution

According to the same procedures as those in the (B-10) procedure of Example 10, except that the respective charging compositions as shown in the B columns of Table 4 and the respective solutions of copolymers having peroxy bonds therein which were prepared by the previously stated (A-13~A-17) procedures, were employed, respective block copolymer solutions were prepared.

(C-13~C-17); Preparation of non-aqueous system dispersion of polymers

The organic liquids as shown in the C columns of Table 4, were added to the respective entire quantity of the solutions of block copolymers which were obtained by the previously stated (B-13~B-17) procedures.

The respective resultant mixtures were mixed, whereby milky white non-aqueous system dispersions of polymers were obtained, respectively.

The content of block copolymers and the viscosity at 25° C. of the respective dispersions are shown in the C columns of Table 4.

Each dispersion was so stable that after it was allowed to stand at 25° C. for 6 months, no appreciable precipitation of the particles therein, no appreciable separation into two layers thereof and no appreciable change of the viscosity were observed.

Each dispersion was applied to the coating test, according to the same procedures as those in Example 10, whereby the obtained film was lustrous and smooth and neither foaming nor flagging therein were observed.

EXAMPLE 18–20

(A-18~A-20); Preparation of solutions having peroxy bonds therein

According to the same procedures as those in the (A-10) procedure of Example 10, except that the charging compositions as shown in the A columns of Example 18–20 in Table 5, the copolymerization temperature for Example 18 was 90° C. and the copolymerization temperature for Example 19 was 100° C., solutions having peroxy bonds therein were prepared, respectively.

(B-18~B-20); Preparation of block copolymer solutions

TABLE 4

| Charging composition and properties of the obtained product | Example 13 | | | Example 14 | | | Example 15 | | | Example 16 | | | Example 17 | | |
|---|---|---|---|---|---|---|---|---|---|---|---|---|---|---|---|
| | (A) | (B) | (C) | (A) | (B) | (C) | (A) | (B) | (C) | (A) | (B) | (C) | (A) | (B) | (C) |
| Charging Composition | | | | | | | | | | | | | | | |
| *Vinyl type monomer* | | | | | | | | | | | | | | | |
| 2-Ethylhexyl methacrylate | 40 | | | | | | | | | 28 | | | | | |
| n-Butyl acrylate | | | | 20 | | | | | | | | | | | |
| n-Butyl methacrylate | | | | | | | 20 | | | | | | 17.5 | 40 | |
| methyl methacrylate | | 60 | | 18 | | | | | | | 125 | | | | |
| Ethyl methacrylate | | | | | | | | 20 | | | | | | | |
| Vinyl acetate | | | | | | | 10 | | | | 7 | | 17 | 18 | |
| Hydroxyethyl methacrylate | | 15 | | 30 | | | | | | | | | | | |
| Acrylic acid | | 2 | | | 2 | | | | | | | | 1.5 | 2 | |
| Styrene | 33 | | | | | | | | | | | | 14 | 40 | |
| Acrylonitrile | | | | | | | | | | | | | | 20 | |
| Acrylamide | | | | | 100 | | | | | | | | | | |
| Vinyl chloride | | | | | | | | 90 | | | | | | | |
| Solution of copolymers having peroxy bonds therein obtained by A-procedure | | 90 | | | 90 | | | 90 | | | 50 | | | 50 | |
| *Organic liquid* | | | | | | | | | | | | | | | |
| Butyl acetate | 50 | | | | | | | | | | | | | | |
| Dimethyl formamide | | | | 50 | | | | | | | | | | | |
| Methylisobutyl ketone | | | | | | | 50 | | | | | | | | |
| Mineral spirit | | | | | | | | | | | | 100 | | | |
| Aliphatic hydrocarbon[1] | | | 100 | | | | | | | | | | | | |
| Petroleum naphtha | | | | | | | | | | | | | 125 | | |
| Toluene | | | | | | | | | | | | 30 | | | |
| Ethyl alcohol | | | | | | | | | | | | | | 20 | |
| Isopropyl alcohol | | | | | | 175 | | | | | | | | | 125 |
| Ethyl cellosolve | | | | | | | | | | | | 5 | | 30 | |
| *Polymeric peroxide* | | | | | | | | | | | | | | | |
| PPO-1[2] | | | | | | | | | | | 3.0 | | | 3.5 | |
| PPO-2[3] | | 2.8 | | | 3.5 | | | 3.0 | | | | | | | |
| *Properties of the obtained product* | | | | | | | | | | | | | | | |
| Content of copolymer having peroxy bonds therein (%) | 42.6 | | | 50.9 | | | 43.0 | | | 51.5 | | | 51.0 | | |
| Content of block copolymer (%) | | 51.4 | | | 40.1 | | | 49.9 | | | 51.1 | | | 50.3 | |
| Viscosity (25° C. poise) | 1.6 | 2.0 | 7.5 | 1.5 | 0.5 | | 2.3 | 4.5 | | 0.6 | 5.9 | 114 | | | |

Note:
[1]Product of Shell Chemical Co.,; Trade Mark; Shellsol 71, Aliphatic hydrocarbons whose distillation temperature range is 173–195° C. according to ASTM D-1078

[2] 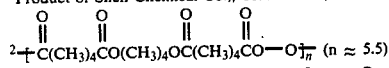 (n ≈ 5.5)

[3]  (n ≈ 5.8)

According to the same procedures as those in the (B-10) procedure of Example 10 except that the respective charging compositions as shown in the B columns of Table 5 and the respective solutions of copolymers having peroxy bonds therein which were prepared by the previously stated (A-13~A-17) procedures, were employed, the copolymerization temperature for Example 18 was 95° C. and the copolymerization temperature for Example 19 was 105° C., respective block copolymer solutions were prepared.

B), whereby the desired milky white non-aqueous system dispersions of polymers were respectively obtained.

The content of block copolymers and the viscosity of these dispersions are shown in Table 5.

These dispersions were so stable that after they were respectively allowed to stand at 25° C. for 6 months, no appreciable precipitation of particles therein, no appreciable separation into two layers thereof and no change of viscosity thereof were observed.

These dispersions were respectively applied to the

TABLE 5

| Charging composition and properties of the obtained product | | Example 18 | | | Example 19 | | | Example 19 | | |
|---|---|---|---|---|---|---|---|---|---|---|
| | | (A) | (B) | (C) | (A) | (B) | (C) | (A) | (B) | (C) |
| Charging Compositon | | | | | | | | | | |
| Vinyl type monomer | Stearyl methacrylate | | | | | | | 35 | | |
| | Lauryl methacrylate | 30 | | | | | | | | |
| | 2-Ethylhexyl methacrylate | | | | 35 | | | | | |
| n-Butyl methacrylate | | 10 | | | | | | 24 | | |
| | Methyl methacrylate | | 30 | | | 27.5 | | | 34 | |
| | Ethyl acrylate | | | | | 36.5 | | | | |
| | Ethyl methacrylate | | 45 | | | | | | 25 | |
| | Glycidyl methacrylate | | | | | | | | 27 | |
| | Hydroxyethyl methacrylate | | | | | 16.5 | | | | |
| | Acylic acid | 5 | 10 | | | 1.6 | | | | |
| | Styrene | | | | | 27.5 | | | | |
| | Acrylonitrile | | 30 | | | | | | | |
| | Solution of polymers having peroxy bonds therein obtained by A-procedure | | | 40 | | | 90 | | | 90 |
| Organic liquid | Ethyl acetate | | | | 25 | | | | | |
| | Methylethyl ketone | 25 | | | | | | 25 | | |
| | Mineral spirit | | | 165 | | | | | | 150 |
| | Aliphatic hydrocarbon[1] | | | | | | 150 | | | |
| | n-Butyl alcohol | 25 | | | | | | | | |
| | Ethyl cellosolve | | | | 25 | | | 10 | | |
| | Polymeric peroxide | | | | | | | | | |
| | PPO-1[2] | | | | | | | 2.5 | | |
| | PPO-3[3] | 1.0 | | | 3.5 | | | | | |
| | PPO-4[4] | 2.5 | | | | | | | | |
| Properties of the obtained product | Content of copolymer having peroxy bonds therein (%) | 42.5 | | | 42.7 | | | 51.3 | | |
| | Content of block coploymer (%) | | | 50.7 | | | 51.1 | | | 51.7 |
| | Viscosity (25° C., poise) | 2.5 | 1.0 | 0.5 | | 1.8 | | 3.0 | | 2.1 |

Note:
[1]the same as that in Table 4
[2]the same as that in Table 4

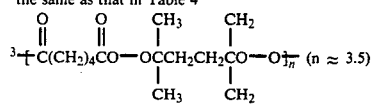

$$^3\text{---}[\text{C(CH}_2)_4\text{CO---OCCH}_2\text{CH}_2\text{CO---O}]_n\text{---} \quad (n \approx 3.5)$$

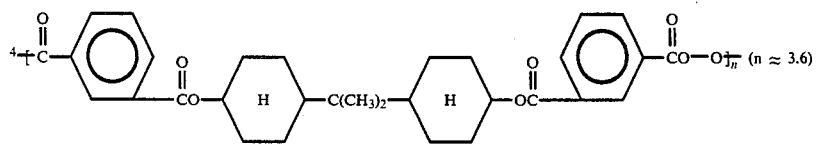

$(n \approx 3.6)$ (C-18~C-20); Preparation of a non-aqueous system dispersion

The entire quantity of respective block copolymer solutions which were obtained by the (B-18~B-20) procedures were applied to a freeze drying method, thereby freezing the organic liquids which were charged in the previously stated ((A-18~A-20) procedures, followed by removing the organic liquids from the block copolymers under reduced pressure to obtain the dried block copolymers.

The obtained block copolymers were respectively mixed with the organic liquids which are shown in the C columns of Table 5 (defined in the previously stated coating test according to the same procedures as those in Example 10, whereby the obtained films were respectively lustrous and smooth and neither appreciable foamng nor flagging therein were observed.

The embodiments of the invention in which an exclusive property or privilege is claimed are defined as follows:

1. A method for producing a non-aqueous liquid dispersion of polymers which consists essentially of the steps of:
    (a) copolymerizing (i) one or more polymeric peroxides selected from the group consisting of the compounds having the formulas I and II,

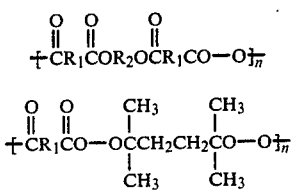

$$+CR_1COR_2OCR_1CO-O+_{\overline{n}} \quad (I)$$

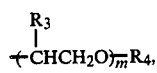 (II)

wherein $R_1$ is a $C_1$-$C_{18}$ alkylene or substituted alkylene group, a $C_3$-$C_{15}$ cycloalkylene or substituted cycloalkylene group, a phenylene or substituted phenylene group, $R_2$ is (1) a $C_2$-$C_{10}$ alkylene group or substituted alkylene group, (2) a group having the formula of $$+CHCH_2O+_{\overline{m}}R_4,$$
$$\quad\quad | \quad\quad$$
$$\quad\quad R_3$$

wherein $R_3$ is hydrogen or methyl, m is an integer of 1 to 13, and $R_4$ is alkylene, (3) 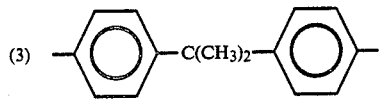

or (4) 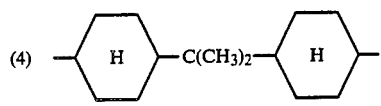

and n is from 2 to 20, with (ii) a first vinyl monomer component consisting of one or more, first, vinyl monomers, wherein (i) and (ii) are dissolved in an organic liquid A, thereby obtaining a solution of a copolymer having peroxy bonds therein dissolved in said organic liquid A, (b) then adding (iii) a second vinyl monomer component consisting of one or more, second, vinyl monomers which are different from said first vinyl monomers or a mixture of said second vinyl monomer component and said organic liquid A into said solution of said copolymer having peroxy bonds therein and subjecting the resultant mixture to block copolymerization, in the absence of an organic liquid B and an organic liquid C, under solution polymerization conditions, effective to obtain a solution of a block copolymer dissolved in said organic liquid A, said block copolymer consisting essentially of polymer blocks of said first vinyl monomer component and polymer blocks of said second vinyl monomer component, and (c) then admixing said organic liquid B or said organic liquid C to said solution of said block copolymer in said organic liquid A, or to said block copolymer which has been prepared by removing said organic liquid A from said solution of said block copolymer, so as to insolubilize a part of said block copolymer whereby to obtain said dispersion;

with the provisos that said organic liquid A is a solvent for said copolymer having peroxy bonds therein and for said block copolymer, said organic liquid B is a non-solvent for polymer blocks consisting of units of said first vinyl monomer component but is a solvent for polymer blocks consisting of units of said second vinyl monomer component, and said organic liquid C is a solvent for polymer blocks consisting of units of said first vinyl monomer component but is a non-solvent for polymer blocks consisting of units of said second vinyl monomer component.

2. A method as claimed in claim 1, wherein the amount used of said polymeric peroxide is 0.5–10 parts by weight based on 100 parts by weight of said first vinyl monomer component, said copolymerization temperature is 60°–130° C. and the copolymerization time is 2–5 hours, and the block copolymerization temperature is 60°–140° C. and the block copolymerization time is 3–6 hours.

3. A method as claimed in claim 1, wherein the amount of the polymer blocks which are soluble in said organic liquid B or said organic liquid C is in the range of 5–70% by weight based on the sum of the amounts of the soluble and insoluble polymer blocks in the non-aqueous system dispersion of polymers.

4. A method as claimed in claim 1, wherein the non-aqueous system liquid dispersion of polymers consists of 30–70 wt. % of solid components and 70–30 wt. % of organic liquid.

5. A method as claimed in claim 4, wherein the amount of the polymer blocks which are soluble in said organic liquid B or said organic liquid C is in the range of 5–70% by weight based on the sum of the amounts of the soluble and insoluble polymer blocks in the non-aqueous system dispersion of polymers.

* * * * *